(12) United States Patent
Campbell

(10) Patent No.: US 12,083,914 B2
(45) Date of Patent: Sep. 10, 2024

(54) SYSTEM AND METHOD FOR A MULTI-CELL RECHARGEABLE ENERGY STORAGE DEVICE

(71) Applicant: GM GLOBAL TECHNOLOGY OPERATIONS LLC, Detroit, MI (US)

(72) Inventor: Charles A. Campbell, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 17/546,198

(22) Filed: Dec. 9, 2021

(65) Prior Publication Data

US 2023/0182596 A1 Jun. 15, 2023

(51) Int. Cl.
*H02J 7/00* (2006.01)
*B60L 53/30* (2019.01)
*B60L 53/66* (2019.01)
*B60L 58/10* (2019.01)
*B60L 58/24* (2019.01)
*H04W 4/38* (2018.01)

(52) U.S. Cl.
CPC .............. *B60L 53/305* (2019.02); *B60L 53/66* (2019.02); *B60L 58/10* (2019.02); *B60L 58/24* (2019.02); *H04W 4/38* (2018.02); *B60L 2240/545* (2013.01); *B60L 2240/547* (2013.01); *B60L 2240/549* (2013.01)

(58) Field of Classification Search
CPC ........ B60L 53/305; B60L 53/66; B60L 58/10; B60L 58/24; B60L 2240/545; B60L 2240/547; B60L 2240/549; H04W 4/38
USPC ............................................ 320/109; 701/22
See application file for complete search history.

(56) References Cited

U.S. PATENT DOCUMENTS

2017/0054311 A1\* 2/2017 Masias ................. B60L 53/12
2019/0033377 A1\* 1/2019 Karner ................ H01M 50/209

\* cited by examiner

*Primary Examiner* — Zixuan Zhou
(74) *Attorney, Agent, or Firm* — Quinn IP Law

(57) ABSTRACT

A management system for a multi-cell rechargeable energy storage system (RESS) is capable of wirelessly communicating with an unsecured third-party device. The management system includes a system controller that is in communication with cell monitoring units that are arranged to individually monitor the battery cells. Each cell monitoring unit includes a cell controller that is in communication with a sensor that is arranged to determine a parameter of a respective one of the battery cells of the RESS. Each of the cell controllers is configured to execute a secure wireless communication protocol, and is also configured to execute an open wireless communication protocol. The open wireless communication protocol is activated to enable non-proprietary wireless communication to a proximal third-party device in response to a trigger event.

20 Claims, 3 Drawing Sheets

_US 12,083,914 B2_

SYSTEM AND METHOD FOR A MULTI-CELL RECHARGEABLE ENERGY STORAGE DEVICE

INTRODUCTION

A rechargeable energy storage system (RESS) can be employed in a stationary energy storage system or in a mobile device, e.g., as part of an electric vehicle (EV). When employed as part of an EV, an electric powertrain employs one or multiple electric machines to generate torque employing energy derived at least in part from an RESS, with the generated torque being delivered to a drivetrain for tractive effort.

The RESS, which can include a multi-cell battery pack, associated power electronics, and thermal regulation hardware, may be controlled via a resident battery controller. The battery controller may be used to monitor the ongoing health of hardware and software components of the RESS, as well as to control electrical charging and discharging operations. Other functions may include monitoring and reporting of battery pack voltage, individual cell voltages and cell currents, states of charge, and temperatures. The battery controller may also perform periodic cell balancing operations to equalize the states of charge of the various battery cells. Individual cell voltages are measured and monitored using associated circuitry so as to keep the battery cells within a permitted voltage window.

Depending on the particular configuration and application of the electric machine, the battery cells of an RESS may be recharged via an offboard charging station and/or via onboard regeneration. Cell data such as individual cell or cell group voltages, charging and discharging electrical currents, respectively, to and from the battery cells or cell groups, and temperature measurements sampled at various locations within the battery system are collected, monitored, and controlled over time by a battery control unit. The battery control unit may be configured to automatically adjust battery control parameters based on the collected cell data.

A battery system arrangement may include a battery pack divided into multiple cell stacks or modules, with each of the battery modules being equipped with an application-specific quantity of battery cells. Communication between elements of a battery system may be accomplished via hard-wired and/or wireless communication devices and protocols. An on-board wireless communication network must be secured and closed using proprietary communication protocols, including encryptions, to prevent inadvertent or intentional corruption or interference by an external system.

A battery pack may experience an undesirable battery thermal condition due to overcharging, battery cell damage, cell charging/discharging imbalances, etc. A thermal runaway event may occur when a rate of heat generation within a battery pack exceeds a rate at which the generated heat can be effectively dissipated by onboard thermal regulation techniques or power control actions.

In the event of an external force event or a thermal event, it may be useful to provide a system manager, a first responder, or another service provider with detailed information to assist in developing a response, such as deployment of countermeasures. As such, there is a benefit to having an on-board wireless communication network that is capable of wirelessly communicating with an unsecured third-party device that may be accessible to or operated by a system manager, a first responder, or another service provider in a manner that does not compromise communication integrity of the battery system.

SUMMARY

The concepts described herein provide a management system for a multi-cell rechargeable energy storage system (RESS) that is capable of wirelessly communicating with an unsecured third-party device. The management system includes a system controller that is in communication with a plurality of cell monitoring units, wherein the plurality of cell monitoring units are arranged to individually monitor the battery cells of the RESS. Each of the plurality of cell monitoring units includes a cell controller that is in communication with a sensor that is arranged to determine a parameter of a respective one of the battery cells of the RESS. Each of the cell controllers is configured to execute a secure wireless communication protocol, and is also configured to execute an open wireless communication protocol. Each of the cell controllers includes an instruction set that is executable to detect a trigger event based upon an input from the sensor that is arranged to monitor the parameter of the respective one of the battery cells of the RESS. The open wireless communication protocol is activated to enable non-proprietary wireless communication in response to the trigger event. The cell controller executes wireless communication to a proximal third-party device via the open wireless communication protocol.

The concepts described herein also provide a management system for a multi-cell rechargeable energy storage system (RESS) that includes a plurality of cell monitoring units arranged to individually monitor battery cells of the RESS, wherein each of the plurality of cell monitoring units includes a cell controller in communication with a sensor that is arranged to determine a parameter of the respective one of the battery cells of the RESS. Each of the cell controllers is configured to execute a secure wireless communication protocol and is configured to execute an open wireless communication protocol. Each of the cell controllers includes an instruction set that is executable to detect a trigger event based upon an input from the sensor that is arranged to monitor the parameter of the respective one of the battery cells of the RESS, activate the open wireless communication protocol to enable non-proprietary wireless communication in response to the trigger event, and wirelessly communicate, via the cell controller and the open wireless communication protocol, the parameter of the respective one of the plurality of battery cells to a proximal third-party device.

The concepts described herein also provide a management system for a multi-cell rechargeable energy storage system (RESS) in the form of a system controller in communication with a plurality of cell monitoring units. The plurality of cell monitoring units are arranged to individually monitor a plurality of battery cells of the RESS, and each of the cell controllers is configured to execute a secure wireless communication protocol and is configured to execute an open wireless communication protocol. Each of the cell controllers includes an instruction set that is executable to detect a trigger event, activate the open wireless communication protocol to enable non-proprietary wireless communication in response to the trigger event, and wirelessly communicate, via the cell controller and the open wireless communication protocol, to a proximal third-party device.

An aspect of the disclosure includes the system controller being capable of executing the secure wireless communication protocol to monitor each of the cells of the RESS absent an occurrence of the trigger event.

Another aspect of the disclosure includes each of the cell controllers being configured to execute, via a front end peripheral device, a reduced encryption protocol.

Another aspect of the disclosure includes each of the cell controllers having a location identifier, and wherein each of the cell controllers is configured to wirelessly communicate, via the cell controller and the open wireless communication protocol, the location identifier to the proximal third-party device upon occurrence of the trigger event.

Another aspect of the disclosure includes each of the cell controllers being configured to execute, via a front end peripheral device, a 2.4 GHz radiofrequency (RF) open communication protocol.

Another aspect of the disclosure includes each of the cell controllers being configured to execute, via the front end peripheral device, the 2.4 GHz RF open communication protocol unidirectionally from the cell controller to the proximal third-party device.

Another aspect of the disclosure includes a temperature sensor being arranged to monitor the respective one of the cells, wherein the trigger event is one of a temperature of the respective one of the battery cells being greater than a maximum threshold temperature, or a time-rate change in temperature of the respective one of the cells being greater than a maximum threshold time-rate change in temperature.

Another aspect of the disclosure includes a current sensor being arranged to monitor the respective one of the battery cells, wherein the trigger event is one of a current of the respective one of the battery cells being greater than a maximum threshold current or a time-rate change in the current of the respective one of the battery cells being greater than a maximum threshold time-rate change in the current.

Another aspect of the disclosure includes a voltage sensor being arranged to monitor the respective one of the battery cells, wherein the trigger event is a voltage of the respective one of the battery cells being less than a minimum threshold voltage or a time-rate change in the voltage of the respective one of the battery cells being greater than a maximum threshold time-rate change in the voltage.

Another aspect of the disclosure includes the trigger event being an urgent message that is communicated from the system controller or from another of the plurality of cell monitoring units.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
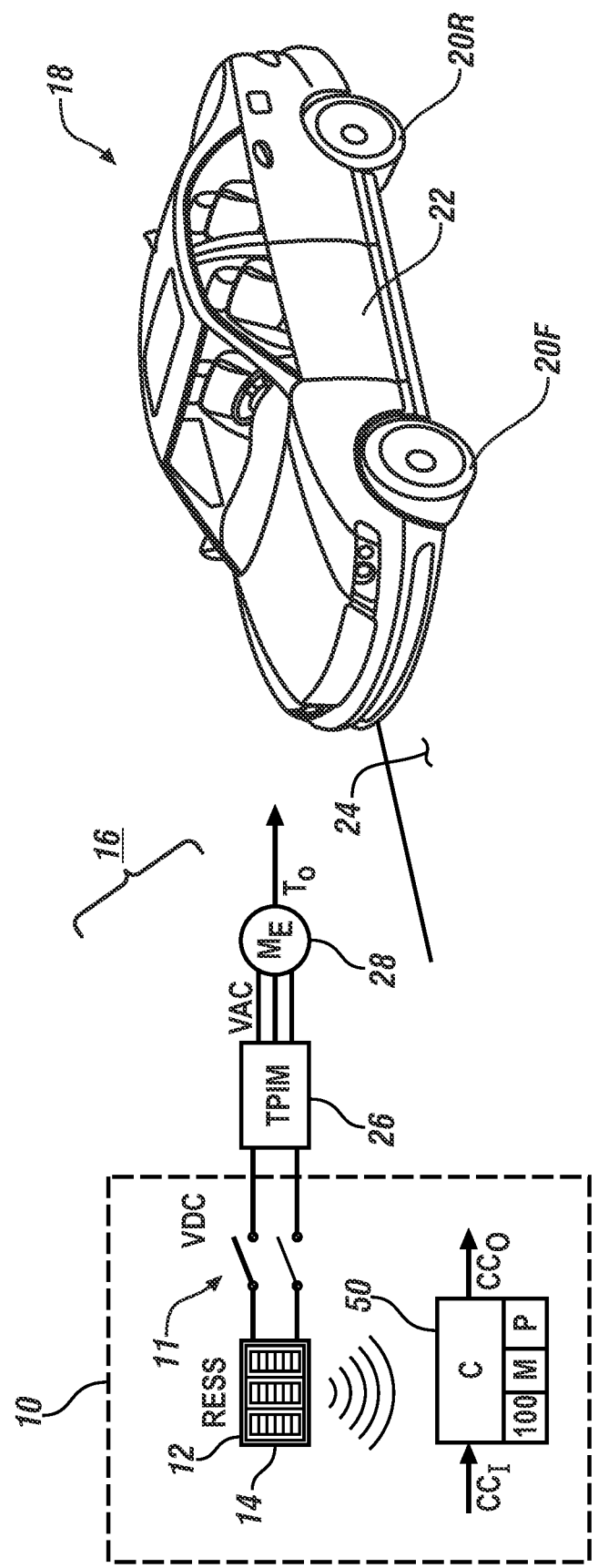
FIG. 1 schematically illustrates an electrical system having a battery system and a battery control network, in accordance with the disclosure.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Embodiments of the present disclosure are described herein in terms of functional and/or logical block components and various processing steps. Such block components may be realized by a number of different hardware components each configured to perform the specified functions. In addition, those skilled in the art will appreciate that embodiments of the present disclosure may be practiced to advantage in conjunction with a number of systems, and that the systems described herein are merely exemplary embodiments of the present disclosure.

Referring to the drawings, wherein like reference numerals are used to identify like or identical components in the various views, FIG. 1 schematically depicts a battery system 10 having a multi-cell rechargeable energy storage system (RESS) 12 and a distributed battery controller network (C) 50. The battery system 10 described herein is embodied as multiple embedded controllers that collectively enable data transfer to occur within the battery system 10, over hardwired connections and/or via secured wireless communication devices and protocols. The battery controller network 50 is depicted schematically in FIG. 1 as a unitary device solely for illustrative simplicity and descriptive clarity, with an embodiment of a hardware implementation example depicted in FIG. 2.

Figure 2:
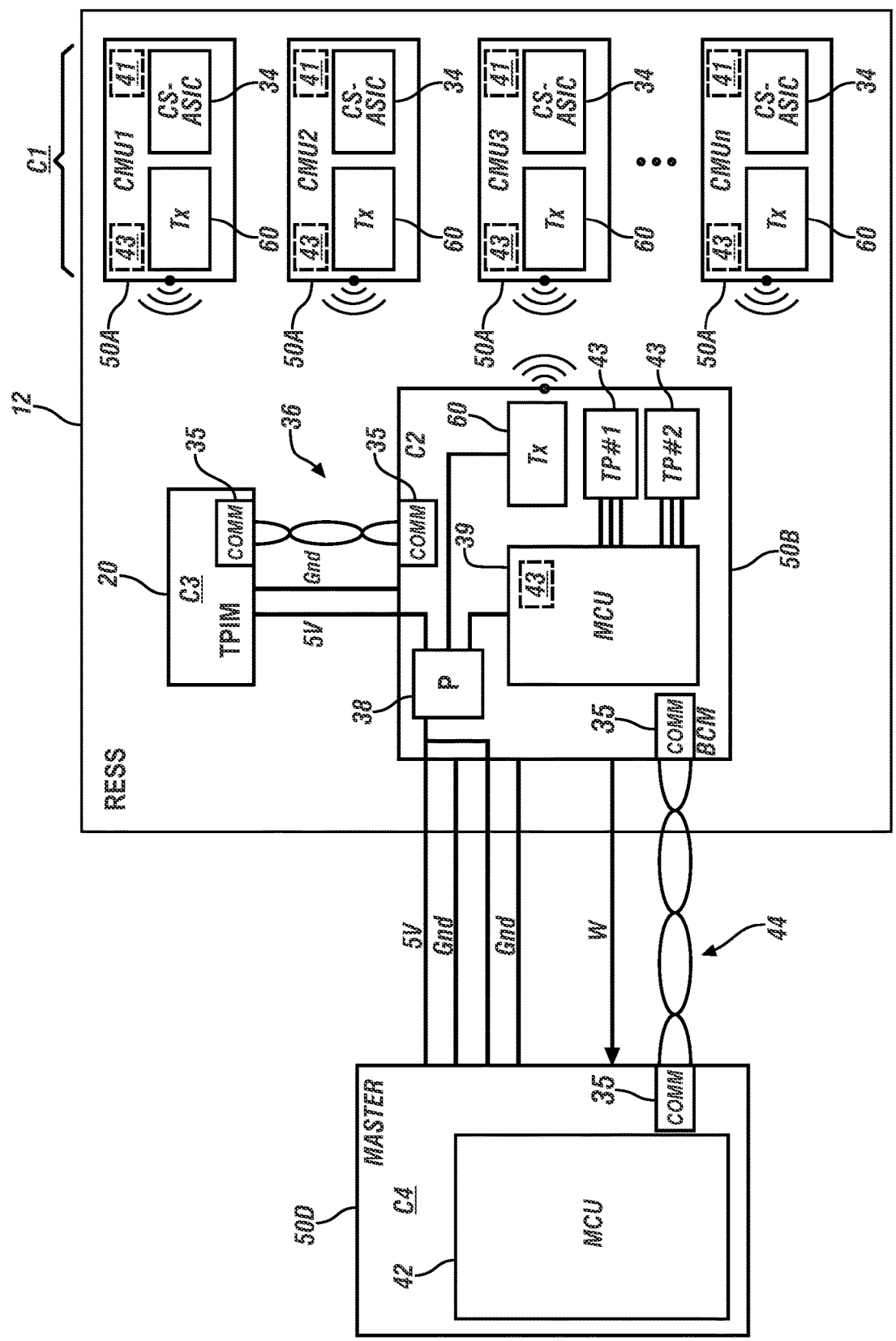
FIG. 2 schematically illustrates a circuit topology, in accordance with the disclosure.

FIG. 1 illustrates a memory (M) and a processor (P), with the example implementation of FIG. 2 or other hardware implementations not specifically depicted in the Figures possibly including several memory and/or processor devices, locations, and hardware configurations within the scope of the disclosure. Collectively, the various controllers making up the battery controller network 50 are programmed to monitor and regulate ongoing thermal and electrical operations of the battery system 10. The constituent controllers of the battery controller network 50 may selectively execute other software programs, including, e.g., cell balancing, health monitoring, electric range estimation, and/or powertrain control operations, with such applications being understood in the art and therefore not described herein.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The battery controller network 50 shown in FIG. 1 receives input signals (arrow $CC_I$), and transmits output signals (arrow $CC_O$) to change or maintain a present operating state of the battery system 10. The battery controller network 50 is embodied as multiple controllers as noted above, i.e., electronic control units and/or application-specific integrated circuits (ASICs) each having or being able to access the requisite memory (M) and processor (P), as well as other associated hardware and software, e.g., a clock or timer, input/output circuitry, etc.

In the exemplary battery system 10 of FIG. 1, multiple electrochemical battery cells 14 are arranged or stacked in close proximity to one another. If a given battery cell 14 should happen to experience a rapid increase in temperature, a cascading domino effect could result as the rapidly rising temperature of the battery cell 14 propagates to nearby battery cells 14. Thus, the battery controller network 50 of FIG. 1 is configured to closely monitor the RESS 12. In one embodiment, the RESS 12 is configured to have onboard cell sensing and cell data communication functions that are integrated directly into the structure of the RESS 12, with communication of the cell data possibly performed wirelessly in some embodiments.

The battery system 10 may be employed in a range of applications or systems, including but not limited to road, air, water, or rail vehicles, agricultural equipment, robots, stationary or mobile powerplants, and other mobile or stationary systems. A possible application of the present battery system 10, and in particular the RESS 12 thereof, is a high-energy direct current (DC) power supply for use in an electric powertrain 16. Such an electric powertrain 16 may be used in some embodiments to propel a motor vehicle 18, e.g., an operator-driven or autonomously-driven passenger or commercial road vehicle. To do so, the electric powertrain 16 may be controlled to generate and deliver output torque (arrow $T_O$) to respective front and/or rear road wheels 20F and/or 20R mounted with respect to a body 22 of the motor vehicle 18. Rotation of the road wheels 20F and/or 20R in an electric or hybrid electric drive mode thus propels the motor vehicle 18 along a road surface 24.

The RESS 12 may be employed as a high-energy/high-voltage power supply aboard the motor vehicle 18. In such an embodiment, the RESS 12 may be selectively disconnected via a set of high-voltage contactors 11 and configured to electrically energize a traction power inverter module (TPIM) 26. The TPIM 26 may contain multiple sets of semiconductor switches and filtering components arranged in phase-specific switching legs, with ON/OFF states of the individual IGBT, MOFSET, or other semiconductor switches changed at a particular rate, e.g., using pulsewidth modulation. Switching control thus enables the TPIM 26 to receive a DC voltage (VDC) from the RESS 12 and to output a polyphase/AC voltage (VAC). Phase windings of a rotary electric machine ($M_E$) 28 may be electrically connected to the TPIM 26, as noted above, such that the output torque (arrow $T_O$) from the electric machine 28 is ultimately delivered to a coupled load, in this instance the road wheels 20F and/or 20R.

FIG. 2 schematically illustrates a non-limiting example of a controller architecture for the exemplary battery controller network 50 shown in FIG. 1, which may be embedded within the battery system 10 and used to determine cell data for each respective battery cell 14 and/or stacks thereof. Such cell data is reported as part of the input signals (arrow $CC_I$) via a hardwired or a wireless/radio-frequency (RF) transmission, e.g., over a secure RF network at 2.4 GHz or another application-suitable frequency. The embedded controllers used to construct the battery controller network 50 may be positioned a distance apart from each other, e.g., between 0.1 m and 0.5 m apart, and therefore when wireless/RF communications are employed, the particular communications protocols used to implement the present teachings may be selected in accordance with the distance of such separation, and with due consideration to electromagnetic interference and other potential sources of signal noise.

The battery controller network 50 may be configured to include a wireless network having the above-noted embedded controllers. In particular, cell sense controllers or cell measurement units (CMUs) 50A are embedded within the RESS 12, with the collective set of controllers 50A collectively indicated as C1. For instance, the RESS 12 may be constructed from a plurality (n) of battery cell groups, with each battery cell group having an application-specific number of battery cells 14 and a respective CMU, i.e., CMU1, CMU2, CMU3, . . . , CMUn 50A. Each CMU 50A is equipped with or in communication with one or multiple sensors 41 that are arranged to monitor the respective battery cell 14 via a battery cell sensing controller 34, and a wireless node (T$_X$) 60. In one embodiment, each CMU 50A may be equipped with a location identifier 43. Alternatively or in addition, the MCU 50B may be equipped with a location identifier 43.

The sensors 41 are illustrated collectively, and may include one of or a combination of a temperature sensor, a voltage sensor, a current sensor, a gas detection sensor, a pressure sensor, or another sensor that is arranged to monitor a parameter of the respective battery cells 14. The sensors 41, wireless nodes 60 and battery cell sensing controller 34 of an embedded wireless CMU 50A enable direct battery cell sensing and wireless communication of sensed cell data to a battery controller (BCM) 50B, labeled C2.

The BCM 50B may reside on or in close proximity to the RESS 12. In turn, the BCM 50B is connected to and magnetically isolated from a battery disconnect service board (BDSB) 50C and a master controller 50D, with the BDSB 50C and the master controller 50D respectively labeled C3 and C4.

The CMUs 50A and the BCM 50B in the depicted topology work in concert during battery operating modes that include a "normal" mode when the master controller 50D is awake or when the motor vehicle 18 is in a driving/charging mode, and a low-power "slow" mode in which the master controller 50D is asleep or when the motor vehicle 18 is in an OFF mode.

Communication between the CMUs 50A and the BCM 50B may employ a 2.4 GHz wireless protocol over a secure wireless network via the wireless node 60, such that cell data measured by the individual CMUs 50A is transmitted via the wireless node 60 to the BCM 50B using low-power radio waves. The 2.4 GHz protocol generally encompasses a frequency range of about 2.402-2.480 GHz. Other RF frequency ranges may be used within the scope of the present disclosure. Likewise, techniques such as Time Synchronized Channel Hopping (TSCH) may be used, along with the IEEE 802.15.4e Standard for Local and Metropolitan Area Networks or other suitable standards.

The BDSB 50C, which along with the BCM 50B may be equipped with its own communications (COMM) chip 35. The BDSB 50C may be programmed with battery-level tasks such as monitoring pack voltage, current, and other values for the RESS 12 as a whole. The BDSB 50C may be electrically connected to the battery controller 50B via 5V or other suitable low-voltage power lines and electrical ground (Gnd).

As part of programmed functionality of the BDSB 50C, the BDSB 50C may, in response to predetermined conditions and/or detected electrical faults, command or request opening of the contactors 11 of FIG. 1 to thereby disconnect the RESS 12.

Further with respect to the battery controller (BCM) 50B, this device may be configured as a control board that receives wired or wirelessly-communicated/RF data from the various CMUs 50A and, at times, other communicated data from the BDSB 50C. In the illustrated configuration, the BCM 50B includes a power supply (PS) 38, the above-noted communications chip 35, and wireless node 60. The power supply 38 may be embodied as a small low-voltage lithium-ion battery or other suitable device, which in turn is connected to and powers a master control unit (MCU) 39, e.g., another ASIC or set of processors performing various programmed tasks in the overall management of the battery system 10.

Exemplary tasks performed by the BCM 50B and/or the CMU 50A may include performance of threshold checks for sensed parameters. The threshold checks may include, e.g., comparing a measured cell voltage with a minimum threshold for the cell voltage, comparing a measured cell current with a maximum cell current threshold, comparing a measured temperature with a maximum temperature threshold. The threshold checks may also include comparing a measured time-rate of change of voltage with a maximum time-rate of change of voltage threshold, comparing a measured time-rate of change of current with a maximum time-rate of change of current threshold, or comparing a measured time-rate of change of temperature with a maximum time-rate of change of temperature threshold. Each of these threshold checks may indicate occurrence of an urgent situation, such as a thermal runaway condition.

The MCU 39 is also configured to selectively perform a wakeup function in which the MCU 39 selectively transmits a binary wakeup signal (arrow W) to the master controller 50D, thereby triggering an MCU 42 of the master controller 50D to perform its own assigned tasks.

An urgent situation that may benefit from having communication with an unsecured third-party device may include a thermal runaway event, which may be caused by overcharging, unbalanced charging, or structural damage to the battery, as may be due to an external force being exerted on a vehicle. By way of example, a lithium-ion embodiment of the battery cell 14 shown in FIG. 1 will tend to exhibit a particular set of detectable behavior when undergoing a thermal runaway event. Thermal runaway may be contained to a single battery cell 14 or may spread to neighboring battery cells 14. Initially, an individual cell voltage of an affected battery cell 14 may decrease due to short-circuited electrodes. Chemical reactions occurring within the battery cell 14 may occur as the anode rapidly heats up, with the heat eventually breaking down protective layers, electrolyte materials, and cell separator materials within the battery cell 14. Exothermic reactions within the battery cell 14 may also generate gasses and increase an interior pressure of the battery cell 14. A ruptured battery cell 14 may likewise vent gasses and possibly particulate matter. One or more of these phenomena may be sensed by one or more of the sensors 41 that are arranged to monitor the respective battery cell 14.

Figure 3:
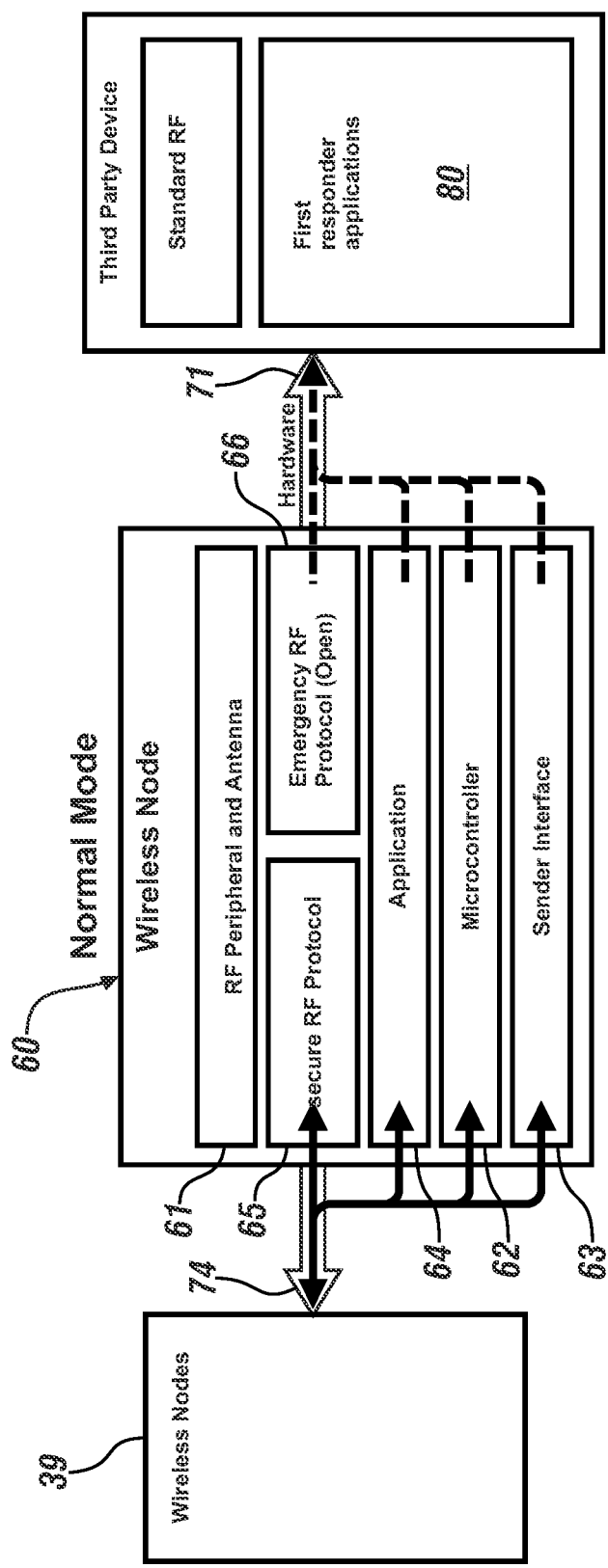
FIG. 3 schematically illustrates details related to a wireless node and its communication in a normal mode, in accordance with the disclosure.

FIG. 3 schematically illustrates details related to an embodiment of the wireless node 60 that is part of the CMU 50A of the RESS 12. The wireless node 60 includes hardware in the form of RF antenna and peripherals 61, microcontroller 62 (including a processor and one or multiple memory devices), and sensor interface 63 (including, e.g., analog-to-digital converters, etc.). The sensor interface 63 communicates with the battery cell sensing controller 34, or is integrated into battery cell sensing controller 34. The wireless node 60 also includes software applications 64, a secure RF protocol 65 and an open RF protocol 66.

The software applications 64 may include, by way of non-limiting examples, sensor calibrations, thresholds for the cell voltage, cell current, temperature, pressure, gas constituents, etc.

The wireless connectivity can include wireless connections to other on-vehicle wireless nodes via the RF antenna and peripherals 61.

The wireless node 60 periodically monitors the one or multiple sensors 41 that are arranged to monitor the respective battery cell 14, and performs evaluations such as threshold checks of the cell voltage, cell current, temperature, pressure, gas constituents, etc., and time-rate changes in the cell voltage, cell current, temperature, pressure, gas constituents, etc., which indicate occurrence of a thermal runaway event or occurrence of another fault.

The wireless node 60 employs the secure RF protocol 65 to perform one-way or two-way communication between the wireless node 60 of the CMU 50A and the MCU 39 and/or other controllers. When operating in a normal mode, the wireless node 60 periodically monitors and evaluates signals from the plurality of sensors 41, employs calibrations, performs the aforementioned evaluations such as threshold checks, and employs the secure RF protocol 65 to perform one-way or two-way communication with the MCU 39 and/or other controllers. This secured communication path is shown with reference to arrow 74.

The wireless node 60 employs the open RF protocol 66 to perform one-way communication from the wireless node 60 of the CMU 50A to one or multiple unsecured third-party devices 80 that are proximal to, i.e., within signal range of the RF antenna and peripherals 61 of the wireless node 60. When operating in an open mode, the wireless node 60 employs the open RF protocol 66 to perform one-way communication with an unsecured third-party device 80. This open wireless communication path is shown with reference to arrow 71.

During operation, a trigger event may be detected that indicates a need for a more open communication protocol than is achievable with the secure RF protocol 65, such as to provide system-critical information in an urgent situation. A trigger event may be caused by an event that is sensed or otherwise determined and is internal to the specific CMU 50A. Alternatively, a trigger event may be caused by an event that is sensed or otherwise determined and is external to the specific CMU 50A, such as a communication from another of the CMUs 50A, or a communication from the MCU 39.

A trigger event that is caused by an event that is sensed or otherwise determined and is internal to the specific CMU 50A may be based upon an input from the aforementioned sensors 41 arranged to monitor the respective battery cell 14 of the RESS 12, when one or more of the threshold checks of the cell voltage, cell current, temperature, pressure, gas constituents, etc., or time-rate changes in the cell voltage, cell current, temperature, pressure, gas constituents, etc., exceeds a corresponding threshold value, which indicates occurrence of a thermal runaway event or occurrence of another fault.

A trigger event that is caused by an event that is external to the specific CMU 50A may be in the form a communication from another of the CMUs 50A, or a communication from the MCU 39. In one example, a trigger event may occur when another of the CMUs 50A has experienced a trigger event, and there is a need to communicate a status or other information to a third-party device 80 via the open RF protocol 66 via the open wireless communication path 71. In response to the trigger event, the open wireless communication protocol 66 is activated to enable non-proprietary one-way wireless communication. The occurrence of the trigger event, the status of the specific CMU 50A, and when equipped, a location identifier 43 can be communicated to one or multiple proximal unsecured third-party devices 80 via the open wireless communication path 71.

This system advantageously enables wireless communication of information originating from a plurality of sensors 41 that are distributed in a battery pack with an unsecured third party device, which may provide more reliable communication as compared with a system having a single communication access point in an urgent situation.

While the best modes for carrying out the disclosure have been described in detail, those familiar with the art to which this disclosure relates will recognize various alternative designs and embodiments lying within the scope of the appended claims. It is intended that the matter contained in the above description and/or shown in the accompanying drawings shall be interpreted as illustrative only and not as limiting.

What is claimed is:

1. A management system for a multi-cell rechargeable energy storage system (RESS), comprising:
   a plurality of cell monitoring units; and
   a system controller in communication with the plurality of cell monitoring units;
   wherein the plurality of cell monitoring units are arranged to individually monitor a plurality of battery cells of the RESS;
   wherein each of the plurality of cell monitoring units includes a cell controller in communication with a sensor that is arranged to determine a parameter of a respective one of the plurality of battery cells of the RESS;
   wherein each of the cell controllers is configured to execute a secure wireless communication protocol and is configured to execute an open wireless communication protocol, and
   wherein each of the cell controllers includes an instruction set that is executable to:
   detect a trigger event based upon an input from the sensor that is arranged to monitor the parameter of the respective one of the battery cells of the RESS;
   activate the open wireless communication protocol to enable non-proprietary wireless communication in response to the trigger event; and
   wirelessly communicate, via the cell controller and the open wireless communication protocol, the parameter of the respective one of the battery cells to a proximal third-party device.

2. The management system of claim 1, further comprising the system controller being capable of executing the secure wireless communication protocol to monitor each of the plurality of battery cells of the RESS absent an occurrence of the trigger event.

3. The management system of claim 1, wherein each of the cell controllers being configured to execute the open wireless communication protocol comprises each of the cell controllers being configured to execute, via a front end peripheral device, a reduced encryption protocol.

4. The management system of claim 1, wherein each of the cell controllers includes a location identifier, and wherein each of the cell controllers is configured to wirelessly communicate, via the cell controller and the open wireless communication protocol, the location identifier to the proximal third-party device upon occurrence of the trigger event.

5. The management system of claim 1, wherein each of the cell controllers being configured to execute the open wireless communication protocol comprises each of the cell controllers being configured to execute, via a front end peripheral device, a 2.4 GHz radiofrequency (RF) open communication protocol.

6. The management system of claim 5, comprising each of the cell controllers being configured to execute, via the front end peripheral device, the 2.4 GHz RF open communication protocol unidirectionally from the cell controller to the proximal third-party device.

7. The management system of claim 1, wherein the sensor arranged to determine a parameter of the respective one of the plurality of battery cells of the RESS comprises a temperature sensor arranged to monitor the respective one of the cells; and wherein the trigger event comprises a time-rate change in temperature of the respective one of the cells that is greater than a maximum threshold temperature.

8. The management system of claim 1, wherein the sensor arranged to determine a parameter of the respective one of the plurality of battery cells of the RESS comprises a temperature sensor arranged to monitor the respective one of the battery cells; and wherein the trigger event comprises a temperature of the respective one of the battery cells that is greater than a maximum threshold temperature.

9. The management system of claim 1, wherein the sensor arranged to determine a parameter of the respective one of the plurality of battery cells of the RESS comprises a current sensor arranged to monitor the respective one of the battery cells; and
wherein the trigger event comprises one of a current of the respective one of the battery cells being greater than a maximum threshold current or a time-rate change in the current of the respective one of the battery cells being greater than a maximum threshold time-rate change in the current.

10. The management system of claim 1, wherein the sensor arranged to determine a parameter of the respective one of the battery cells of the RESS comprises a voltage sensor arranged to monitor the respective one of the battery cells; and wherein the trigger event comprises a voltage of the respective one of the battery cells being less than a minimum threshold voltage or a time-rate change in the voltage of the respective one of the battery cells that is greater than a maximum threshold time-rate change in the voltage.

11. A management system for a multi-cell rechargeable energy storage system (RESS), comprising:
a plurality of cell monitoring units arranged to individually monitor a plurality of battery cells of the RESS;
wherein each of the plurality of cell monitoring units includes a cell controller in communication with a sensor that is arranged to determine a parameter of a respective one of the plurality of battery cells of the RESS;
wherein each of the cell controllers is configured to execute a secure wireless communication protocol and is configured to execute an open wireless communication protocol, and
wherein each of the cell controllers includes an instruction set that is executable to:
detect a trigger event based upon an input from the sensor that is arranged to monitor the parameter of the respective one of the plurality of battery cells of the RESS;
activate the open wireless communication protocol to enable non-proprietary wireless communication in response to the trigger event; and
wirelessly communicate, via the cell controller and the open wireless communication protocol, the parameter of the respective one of the plurality of battery cells of the RESS to a proximal third-party device.

12. The management system of claim 11, wherein each of the cell controllers being configured to execute the open wireless communication protocol comprises each of the cell controllers being configured to execute, via a front end peripheral device, a 2.4 GHz radiofrequency (RF) open communication protocol.

13. The management system of claim 11, comprising each of the cell controllers being configured to execute, via a front end peripheral device, the 2.4 GHz radiofrequency (RF) open communication protocol unidirectionally from the cell controller to the proximal third-party device.

14. The management system of claim 11, wherein each of the cell controllers being configured to execute the open wireless communication protocol comprises each of the cell controllers being configured to execute, via a front end peripheral device, a reduced encryption protocol.

15. The management system of claim 11, wherein each of the cell controllers includes a location identifier, and wherein each of the cell controllers is configured to wirelessly communicate, via the cell controller and the open wireless communication protocol, the location identifier to the proximal third-party device upon occurrence of the trigger event.

16. The management system of claim 11, wherein the sensor arranged to determine a parameter of the respective one of the plurality of battery cells of the RESS comprises one of a temperature sensor, a current sensor, or a voltage sensor that is arranged to monitor the respective one of the plurality of battery cells.

17. The management system of claim 11, wherein the trigger event comprises a time-rate change in one of temperature, current, or voltage of the respective one of the battery cells that is greater than a respective maximum threshold time-rate of change.

18. The management system of claim 11, wherein the trigger event comprises one of temperature, current, or voltage of the respective one of the battery cells being greater than a respective maximum threshold for the temperature, current, or voltage of the respective one of the battery cells.

19. A management system for a multi-cell rechargeable energy storage system (RESS), comprising:
a system controller in communication with a plurality of cell monitoring units;
wherein the plurality of cell monitoring units are arranged to individually monitor a plurality of battery cells of the RESS;
wherein each of the cell controllers is configured to execute a secure wireless communication protocol and is configured to execute an open wireless communication protocol, and
wherein each of the cell controllers includes an instruction set that is executable to:
detect a trigger event;
activate the open wireless communication protocol to enable non-proprietary wireless communication in response to the trigger event; and
wirelessly communicate, via the cell controller and the open wireless communication protocol, to a proximal third-party device.

20. The management system of claim 19, wherein the trigger event comprises an urgent message communicated from the system controller or from another of the plurality of cell monitoring units.

* * * * *